United States Patent [19]

Yoshida et al.

[11] Patent Number: 5,010,579

[45] Date of Patent: Apr. 23, 1991

[54] HAND-WRITTEN, ON-LINE CHARACTER RECOGNITION APPARATUS AND METHOD

[75] Inventors: Kimiyoshi Yoshida, Kanagawa; Akio Sakano, Ibaraki; Hirofumi Tamori, Tokyo; Masayuki Chatani, Kanagawa, all of Japan

[73] Assignee: Sony Corporation, Tokyo, Japan

[21] Appl. No.: 398,086

[22] Filed: Aug. 24, 1989

[30] Foreign Application Priority Data

Aug. 30, 1988 [JP] Japan ................. 63-215572

[51] Int. Cl.⁵ ............................... G06K 9/00
[52] U.S. Cl. .............................. 382/13; 382/11; 382/37
[58] Field of Search ...................... 382/11, 13, 37

[56] References Cited

U.S. PATENT DOCUMENTS

| | | | |
|---|---|---|---|
| 3,846,752 | 11/1974 | Nakano et al. | 340/146.3 |
| 3,996,557 | 12/1976 | Donahey | 340/146.3 SY |
| 4,045,773 | 8/1977 | Kadota et al. | 340/146.3 SG |
| 4,317,109 | 2/1982 | Odaka et al. | 340/146.3 AC |
| 4,495,646 | 1/1985 | Gharachorloo | 382/13 |
| 4,531,231 | 7/1985 | Crane et al. | 382/13 |
| 4,561,105 | 12/1986 | Crane et al. | 382/13 |
| 4,610,025 | 9/1986 | Blum et al. | 382/9 |
| 4,653,107 | 3/1987 | Shojima et al. | 382/13 |
| 4,654,873 | 3/1987 | Fujisawa et al. | 382/9 |
| 4,718,102 | 1/1988 | Crane et al. | 382/13 |
| 4,731,857 | 3/1988 | Tappert | 382/9 |
| 4,827,530 | 5/1989 | Yamaguchi et al. | 382/13 |
| 4,850,025 | 7/1989 | Keiko Abe | 382/9 |

FOREIGN PATENT DOCUMENTS

0166271 2/1986 European Pat. Off.
0279158A2 8/1988 European Pat. Off.

Primary Examiner—David K. Moore
Assistant Examiner—Daniel Santos
Attorney, Agent, or Firm—Philip M. Shaw, Jr.

[57] ABSTRACT

A hand-written, on-line character recognition apparatus, and the method employed by it, in which the structure of a dictionary for recognition is formed as a subroutine type, whereby the dictionary can be made small in size and a time necessary for recognition can be reduced.

8 Claims, 8 Drawing Sheets

HAND-WRITTEN, ON-LINE CHARACTER RECOGNITION APPARATUS AND METHOD

BACKGROUND OF THE INVENTION

1. Field of the Invention

The present invention relates generally to a hand-written, on-line character recognition apparatus and method and, more particularly, is directed to an evaluation tree scan control apparatus and method for use with a hand-written, on-line character recognition apparatus and method.

2. Description of the Prior Art

In order to understand the present invention more clearly, let us first explain the general principles of stroke order of hand-written Japanese characters. Though there are inevitably a number of exceptions, most Japanese characters are written according to the established principles of stroke order. Generally, hand-written characters are recognized in the following two steps.

1st step: To extract various characteristics from strokes (dot data) of a hand-written character data obtained from a data tablet by a tablet pen.

2nd step: To evaluate the characteristics extracted in the 1st step by comparing them with the characteristics of each character described in a recognition dictionary data base, thereby detecting the character having the best evaluated result.

The recognition dictionary data base used in the 2nd step describes therein characteristics of respective characters as follows.

For example, the Japanese character (KANJI in Japanese) "═" describes a characteristic which means a horizontal stroke "→". Further, the Japanese character "═" describes a characteristic which means two strokes but in the cursive-style or in the semi-cursive style. This symbol describes a characteristic of "→", "↙" and "→". In this case, the broken arrow characteristic "↙" indicates the movement of a pen between the two hand-written strokes. Furthermore, a character "+" is written by two strokes but it really describes characteristics of "→", "↘" and "↓↘". Also in this example, the broken arrow characteristic represents the movement of the pen between two hand-written substrokes. In this case, the description of "→" is included in the above-mentioned two Kanji characters "═" and "+".

This is also true for Kanji characters having a common portion. Though the above-mentioned Kanji characters "═" and "+" are simpler and are essentially considered to be single element characters, most Kanji comprise two or more elements. In almost all cases, there is one key element, known as the radical, which indicates the general nature of the character. This radical combines with one or more other elements which give more specific information. For example, the Kanji character "森" (meaning "forest" in English) is the combination of the radical "木" (meaning "tree" and "wood" in English) and the Kanji character "林" (meaning "tree" in English) to provide the meaning of "forest" in English. Further, the Kanji character "松" is the combination of radical "木" and another element "公" (meaning "public," "fair" or "lord" in English) to provide the meaning of "pine" in English.

As described above, though the Kanji characters "林" and "松" have the common radical "木," they are separately described in the dictionary. Furthermore, there are Kanji characters which allow a plurality of stroke orders when hand-written. Let us consider Kanji when hand-written. For example, let us consider the Kanji character, "右" (meaning "right" in English). The Kanji character "右" is the combination of the element "ナ" and the element of "口" ("mouth" in English) to provide the meaning of "right" in English. In this case, in order to write the Kanji "右," there are two stroke orders. One describes characteristics of "→, ↙, ↘" and the other describes characteristics "→, ↘, ↙ and ↘→". In addition, the characteristics of the Kanji character "口" are again described therein.

As described above, though the characteristics described in the prior art dictionary have the common portion, the prior-art dictionary describes the whole characteristics of different Kanji characters in parallel. As a result, since the prior-art dictionary for recognition is constructed as described above, the dictionary has many overlapping portions for Kanji characters and thus, the dictionary is inevitably made large in size.

Further, during evaluation, the common characteristic portion is scanned in a multiplexed fashion, i.e. is scanned a multiple number of times, which increases the time required for recognition.

OBJECTS AND SUMMARY OF THE INVENTION

Accordingly, it is an object of the present invention to provide an improved hand-written, on-line character recognition apparatus and method which can eliminate the above-mentioned defects encountered with the prior art.

More specifically, it is another object of the present invention to provide a hand-written, on-line character recognition apparatus and method which can considerably compress the size of a dictionary for recognition.

It is still another object of the present invention to provide a hand-written, on-line character recognition apparatus and method which can reduce the necessary time for recognition.

According to an aspect of the present invention, there is provided a hand-written, on-line character recognition apparatus and the method employed by it comprising:

(a) means for electronically receiving handwritten pattern information data;

(b) dictionary means organized in a tree and branch structure for electronically storing character data describing characteristics of characters;

(c) evaluation scan control means for scanning the tree and branches of the dictionary means to search for character data corresponding to the hand-written pattern information data; and (d) save means for storing the conditions of the evaluation scan control means, wherein at least the conditions of the scan existing at the beginning of each branch are saved in the save means upon branching in order to allow recursive use of branches of the character data stored in the dictionary means.

These and other objects, features and advantages of the present invention will be apparent in the following detailed description of a preferred embodiment when read in conjunction with the accompanying drawings, in which like reference numerals are used to identify the same or similar parts in the several views.

DETAILED DESCRIPTION OF A PREFERRED EMBODIMENT

An embodiment of a hand-written, on-line character recognition apparatus and method according to the present invention will now be described in detail with reference to the drawings.

Figure 1:
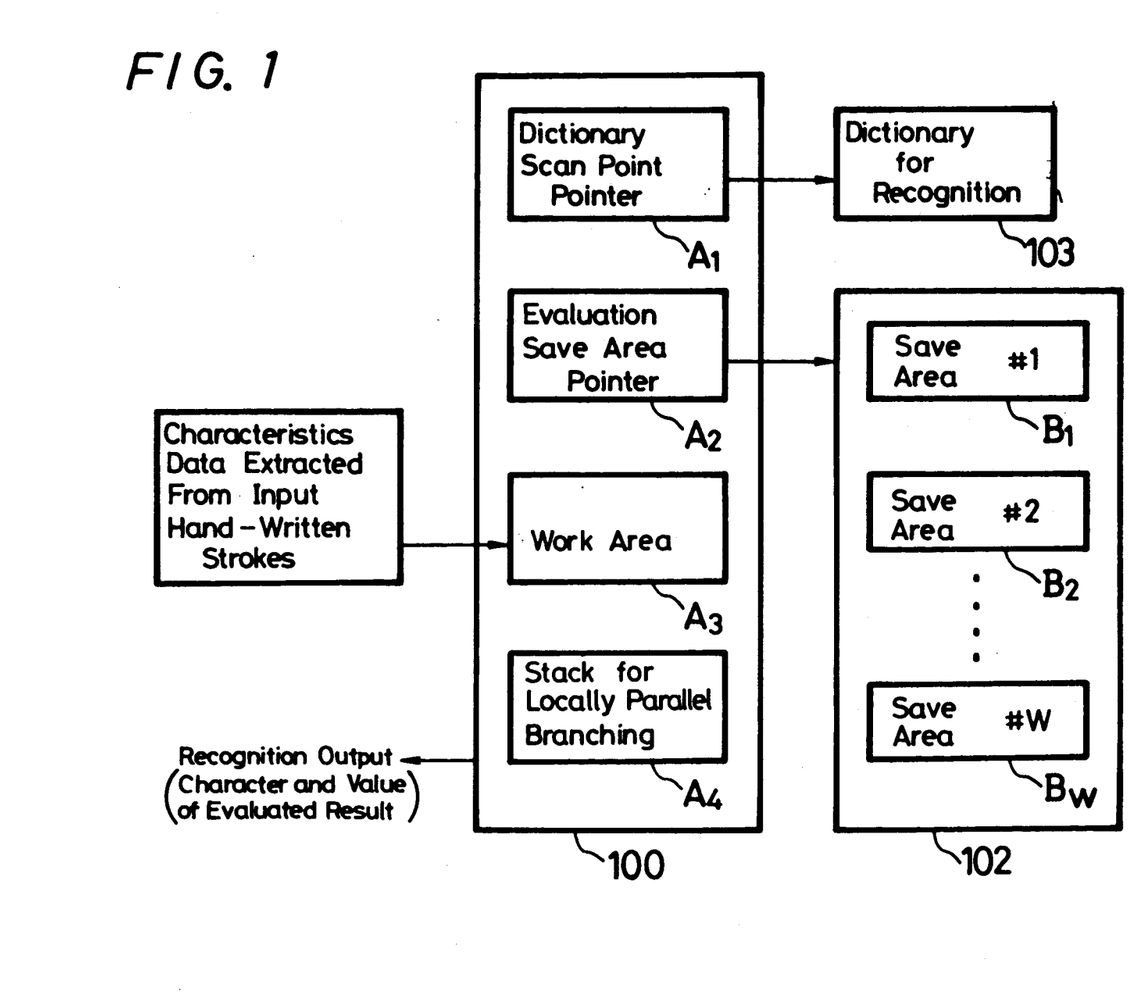
FIG. 1 is a block diagram schematically showing a functional block arrangement illustrating the operation of a hand-written, on-line character recognition apparatus and method according to an embodiment of the present invention, although it is to be understood that the operations are actually carried out by a programmed computer.

FIG. 1 shows an overall functional block arrangement of a hand-written, on-line character recognition apparatus and method according to an embodiment of the present invention. It will be understood that, for the most part, the apparatus is a computer programmed to carry out the functions now to be discussed.

Referring to FIG. 1, it will be seen that the hand-written, on-line character recognition apparatus and method of the present invention is comprised of a scan control central unit 100, a scan condition save memory unit 102 and a recognition dictionary data base 103.

The scan control central unit 100 receives sequential characteristic data which are extracted from the stroke data of a hand-written character obtained from a tablet pen (not shown). Then the scan control central unit evaluates the thus obtained handwritten character data on the basis of the characteristics of each character derived from the recognition dictionary data base 103.

In order to execute the above-mentioned processing, the scan control central unit 100 includes a dictionary scan point pointer $A_1$, an evaluation save area pointer $A_2$, a work area $A_3$ and a stack area $A_4$ for locally parallel branching.

In this embodiment, the dictionary scan point pointer $A_1$ indicates a present position at which the dictionary data base 103 is to be read out. The pointer $A_1$ might be, for example, an address register, and an evaluation command is derived from the dictionary data base 103 at the point indicated by the pointer $A_1$. The evaluation save area pointer $A_2$ indicates an area for saving the various conditions of the central unit 100 when branching occurs during the evaluation-process, for example, when the content of the dictionary at the point indicated by the dictionary scan point pointer $A_1$ means a tree branch on a parallel tree branch. Each time branching occurs, the evaluation save area pointer $A_2$ indicates one save area within the scan condition save memory unit 102.

Figure 2:
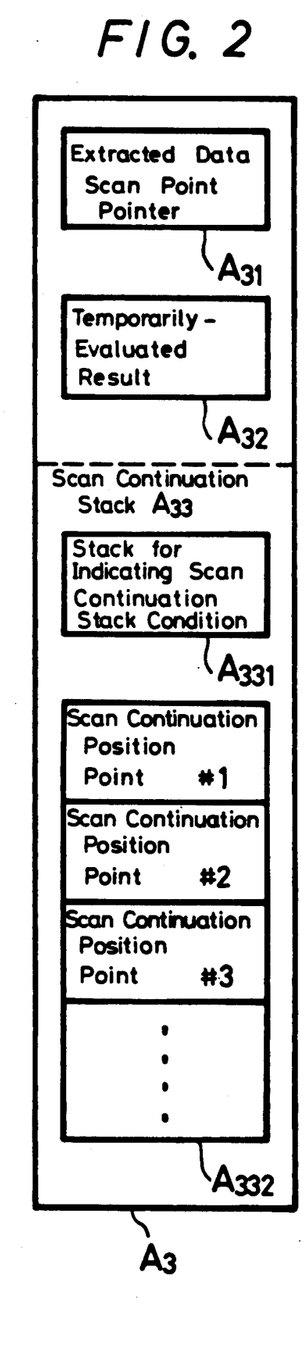
FIG. 2 is a schematic diagram showing a work area used in the apparatus and method of the present invention.

FIG. 2 shows the contents of the work area $A_3$ in the memory of the central unit 100 more fully. Referring to FIG. 2, it will be seen that the work area $A_3$ is provided with an extracted data reading point pointer $A_{31}$ for the hand-written strokes necessary to sequentially execute the recognition evaluation process, a temporarily-evaluated result memory (partial coincidence or the like) $A_{32}$ and a scan continuation stack $A_{33}$ for the recognition dictionary data base 103. In order to allow a recursive citation, the stack area $A_{33}$ is provided with a stack area $A_{332}$ for saving a plurality of scan continuation points and $A_{331}$ for indicating the stack condition such as the number of scan continuation points saved in the stack area $A_{332}$ (the position of the latest scan continuation point saved in the stack area $A_{332}$. The stack $A_{33}$ generally operates in a first-in-last-out (FILO) fashion.

Figure 3:
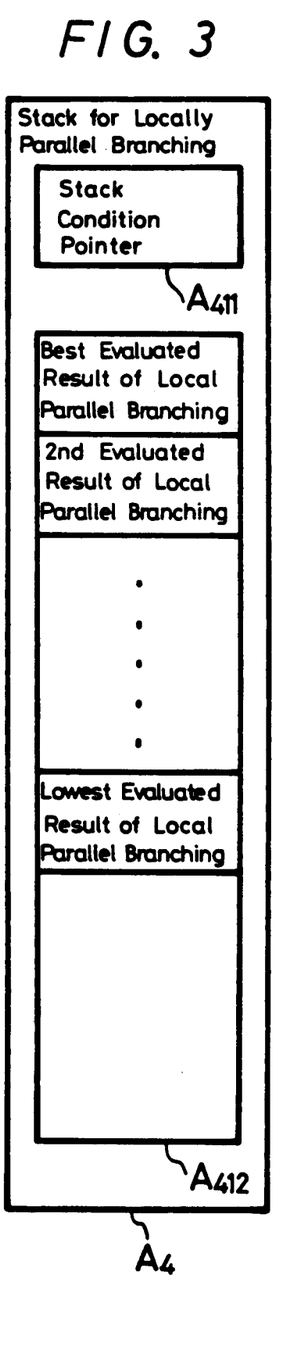
FIG. 3 is a schematic diagram showing a locally parallel stack used in the apparatus and method of the present invention.
Figure 4:
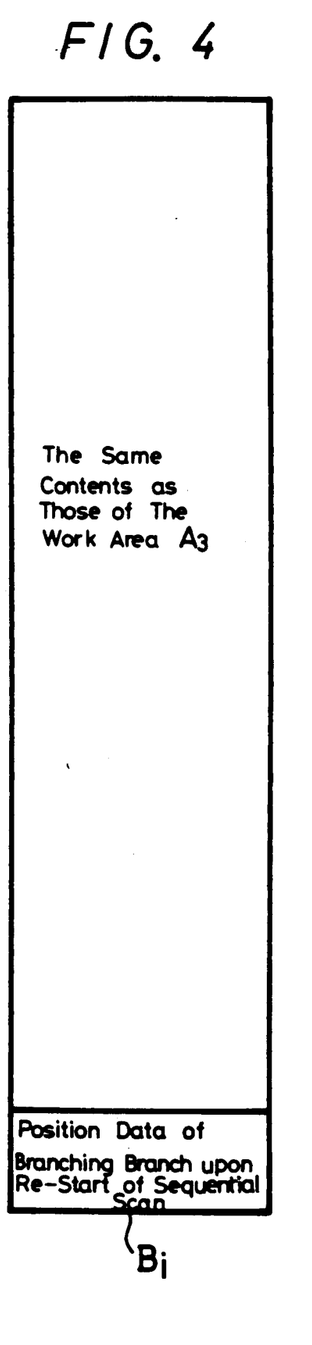
FIG. 4 is a schematic diagram showing a save area used in the apparatus and method of the present invention.

The arrangement of the stack $A_4$ for locally parallel branching will be described in more detail with reference to FIG. 3. As shown in FIG. 3, the stack $A_4$ is provided with a stack condition pointer $A_{411}$ for indicating a multiplicity of locally parallel branches and a plurality of evaluation result store memories $A_{412}$ for storing the temporarily-evaluated results of parallel branching.

Referring back to FIG. 1, the scan condition save memory unit 102 is comprised of W save areas $B_1$, $B_2$, ... $B_W$ where W is a value larger than the maximal stages of the branches in the recognition dictionary data base 103. In this embodiment, the i-th save area $B_i$ (i=any one of 1 to W) is a memory which stores the various conditions of the central unit 100 at a time point when the branching occurs in the evaluation-process of the recognition dictionary data base 103 and the starting position of the next branch.

Figure 5:
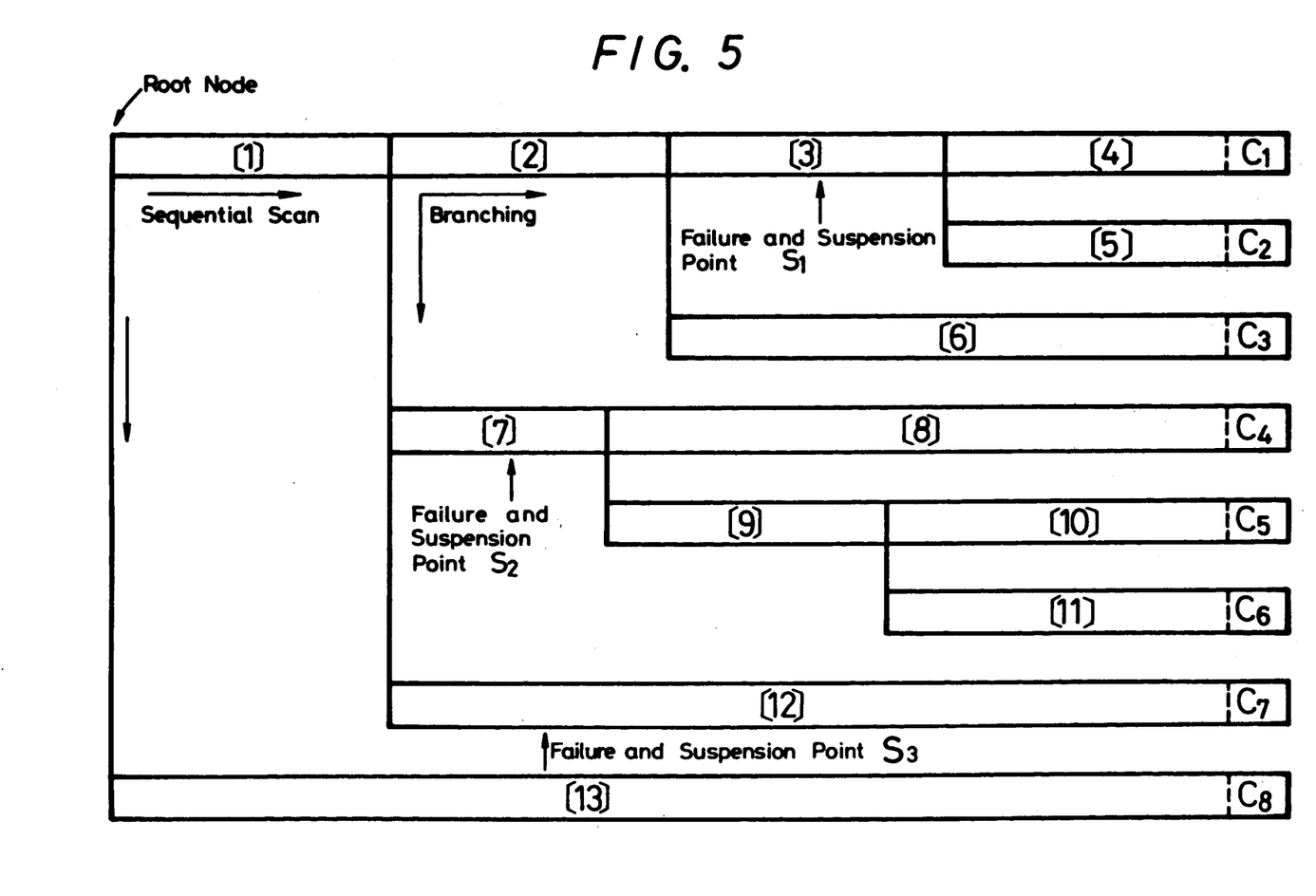
FIG. 5 is a schematic representation used to explain the outline of the evaluation applied to incoming strokes of a hand-written character by using a dictionary.

The outline of the evaluation tree scan processing which is executed on the incoming hand-written character by using the recognition dictionary data base 103 will be described next with reference to FIG. 5. In FIG. 5, reference numerals [1] to [13] denote the sequential order of the evaluation scan when a suspension of the scan does not occur. Suspension points $S_1$ to $S_3$ are points at which the degree of inconsistency becomes worse and then exceeds a predetermined limit value when executing the sequential evaluation scan of strokes of the hand-written character from the root or start node. When the evaluation scan reaches the character code $C_n$ (n=any one of 1 to 8) of the terminal of the branch without being suspended, the recognized result of the above character code $C_n$ is generated as a candidate character together with the evaluation result. Further, in the illustrated example, the number of branches is selected to be four in the sequential scan, i.e.

the root node, and node points between branches [1] and [2], [2] and [3], and [3] and [4].

Sequential scan

The sequential scan will now be described. In the sequential scan, an evaluation command is sequentially derived from the character dictionary data base 103 in accordance with the branch of the content (evaluation tree) of the character dictionary data base 103. Thereafter, characteristic data of the input hand-written stroke (this is extracted from the hand-written stroke) is evaluated on the basis of the evaluation command described in each branch.

Branching scan

Each time when the evaluation scan reaches the branching node of the evaluation tree in the sequential scan, the condition of the central unit 100 at that time point is saved in the save area $B_i$ and then the sequential scan is continued along with the first branch (in the case of FIG. 5, branch [2], [3] and [4], etc.)

Suspension of scan

When the value of the evaluated result exceeds a predetermined limit in the sequential scan (during the evaluation process), the scan to the succeeding branch is suspended and the evaluation is returned to the preceding branching node. Then, the condition of the central unit 100 is returned to the condition presented just before the branch, as saved in the save area $B_i$, and the sequential scan is re-started along with the other branch (branch [6] in the case of FIG. 5). The re-start point is the node nearest to the point at which the scan is suspended (the node between [2] and [3] in FIG. 5.).

Terminal end of scan

When the sequential scan reaches the terminal end of the tree, the character code Cn described at the terminal end is used as the output character and the candidate character code is generated together with the evaluation point. After the candidate character code is generated, the sequential scan is re-started in accordance with another branch from the nearest branch node similarly to the suspension of scan. For example, if the scan is terminated at the branch [6], the scan is restarted from the branch [7].

The scan of the evaluation tree shown in FIG. 5 will now be explained. It will be seen in FIG. 5 that as to a certain hand-written stroke, the scan is carried out in the sequential order of the evaluation branches [1], [2] and [3]. If the degree of inconsistency, i e. the extent to which the hand-written stroke does not match the character under consideration from the recognition dictionary data base, is increased at the evaluation branch [3], the scan is suspended at the suspension point $S_1$ and then the scan is executed for an evaluation branch [6]. After the character code C3 is generated together with the evaluation point, the scan of the evaluation branch [7] is started. In the evaluation branch [7], however, the scan is suspended at a suspension point $S_2$ so that the scan of the evaluation branch [12] is started next. Similarly, the scan of an evaluation branch [12] is suspended at the suspension point $S_3$ and this time, an evaluation branch [13] is scanned. Then, a character code $C_8$ is obtained together with the evaluation point. In this case, the character codes C3 and $C_8$ are obtained as candidate characters. Such an evaluation scan is carried out for all the characters of the recognition dictionary and a character code having the best evaluation point is finally selected. If the suspension point $S_1$ is not provided in FIG. 5, then the character codes $C_1$ and $C_2$ are also to be obtained together with the evaluation point, respectively.

The logic structure of the recognition dictionary and the scan thereof, which are the most specific features of the present invention, will be described next.

Citation branching $A_1$ portion of the strokes of the Kanji character includes a portion which has a common characteristic relative to various Kanji characters such as radicals "Hen," "Tsukuri" or partial portions thereof. Therefore, these commonly usable characteristic evaluation commands (hereinafter, referred to as citing descriptions) are extracted and stored at one place in the recognition dictionary 3. Then, the citing description is called from a number of character evaluation descriptions.

Figure 6A:
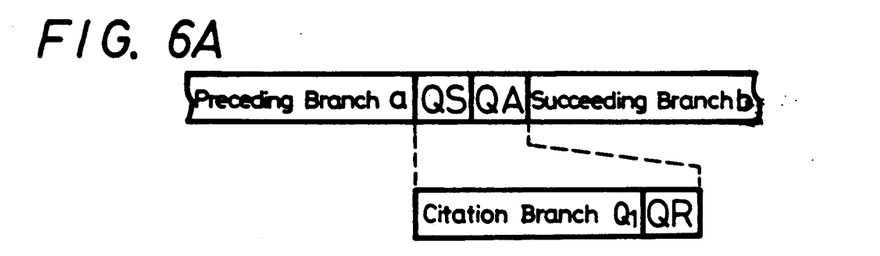
FIGS. 6A and 6B are, respectively, schematic representations of a logic structure of a dictionary used in the present invention, and which are useful for explaining the citing description of the present invention.

FIG. 6A shows a part of the logic structure of the recognition dictionary 3. As shown in FIG. 6A, a preceding branch a is followed by a citation start mark QS and position data QA indicating the position of a citing description branch at a point necessary to the citation. A return code QR indicating the end of the citation is assigned at the end of the citing description branch $Q_1$.

The form of the position data QA indicating the address of the citing description might be an absolute address, a relative address or a citing description number which produces an address from a table.

When the citation start mark QS is determined during the sequential scan, the position data at the starting portion of the succeeding branch b is saved (or pushed) in the scan continuation stack $A_{33}$ of the work area $A_3$ of the central unit 100. Then, a position information address of the citing description branch $Q_1$ is obtained from the position data QA and is set in the dictionary scan point pointer $A_1$ of the central unit 100, whereby the sequential scan is continued along the citing description branch $Q_1$.

When the return code QR is obtained at the end of the citing description branch $Q_1$ while the sequential scan is executed along the citing description branch $Q_1$, the position information of the succeeding branch b previously saved (or pushed) in the scan continuation stack $A_{33}$ of the central unit dictionary scan point pointer $A_1$. Thereafter, the sequential scan is continued along the succeeding branch b.

Figure 6B:
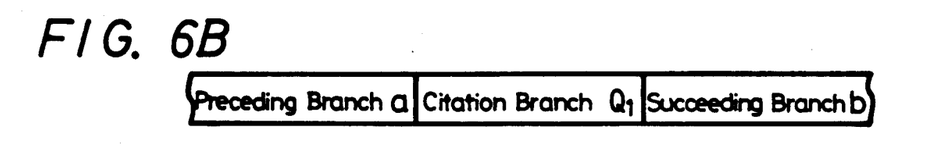

Thus, the scan in this case becomes effectively as shown in FIG. 6B, whereby the scan is executed in the sequential order of the preceding branch a, the citing description branch $Q_1$ and the succeeding branch b.

Tree branching

In various kinds of characters, there are some whose sub-strokes have a common characteristic such as a radical [Hen] and so on. In order to recognize the hand-written character, the input hand-written stroke is compared and evaluated with characteristics of all the characters stored in the dictionary and a character whose characteristic is sufficiently identical with the stroke of the hand-written character is selected therefrom. When the hand-written character is compared with many kinds of characters, if the common portion such as a radical is compared and evaluated only one time and the compared result is stored in the memory, the comparison of the common portion of the succeeding characters having the same common portion becomes unnecessary and hence can be omitted. Thus, only the different portion need be evaluated.

Tree branching processing is based on the above-mentioned idea. Using tree branching processing, the save areas $B_1$ to $B_W$ are provided in the unit 2 so as to save the partial evaluated results from the evaluation start to the node where an evaluation of non-common portion of a character occurs. Before starting the sequential scan of the branches [2], [3] and [4] shown in FIG. 5, the condition of the unit 100 immediately before the sequential scan and the succeeding scan re-start point branches (starting positions of the branches [7], [6] and [5]) are each saved as a set, thereby realizing a recursive multi-branching scan.

Figure 7A:
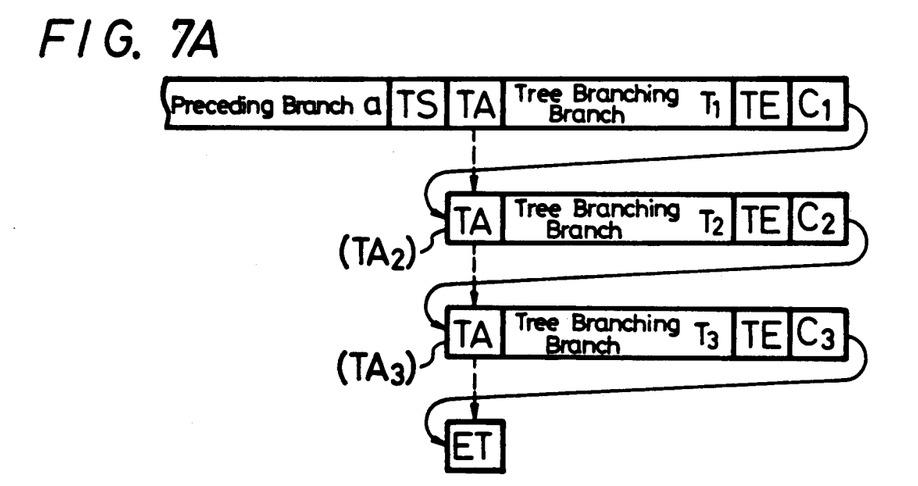
FIGS. 7A and 7B are, respectively, schematic representations used to explain tree branching processing of the present invention.

FIG. 7A shows the logic structure of the recognition dictionary 3. As shown in FIG. 7A, following the preceding branch a, a tree branching start mark TS for indicating a tree branching node is located at a node where tree branching becomes necessary. Then, position data TA indicating the starting position of the next tree branch $T_{j+1}$ (j=1 to 3 in FIG. 7A), the tree branch $T_j$, the end code TE and the character code $C_j$ are provided as a set and a plurality of these sets are provided. (In this embodiment three sets in FIGS. 7A-7B).

The expression form of the position data TA is the length of the branch $T_{j+1}$, the absolute address of the succeeding branch $T_{j+1}$ and so on. As shown in FIG. 7A, the character code $C_3$ of the last tree branch $T_3$ is followed by the end code ET which indicates the end of a tree branch group, and the position data $TA_3$ of the tree branch $T_3$ is data indicating the position of the end code ET.

The end code ET indicates the completion of all evaluations about one character, and the character code $C_j$ is a type of code which can correspond to the evaluated result up to the tree branch $C_j$, for example, a JIS (Japanese Industrial Standards) code.

When the tree branching start code TS is discovered in the sequential scan, all information of the work area $A_3$ (evaluated results of the extracted data scan position pointer $A_{31}$ the value of the evaluated result $A_{32}$ and the scan continuation stack $A_{33}$) and the position information of the succeeding branching calculated from the position data TA are transferred to and saved in the save area $B_i$ pointed out by the evaluation save area pointer $A_2$ in the central unit 100, and then the sequential scan is continued.

The save area $B_i$, pointed by the evaluation save area pointer $A_2$ of the unit 100, proceeds to the adjacent save area each time the evaluated results are transferred and saved therein.

When the scan reaches the end code TE in the sequential scan, all of the value of the evaluated result in the save area $B_i$ and the character code $C_j$ following the end code TE are provided as a set, which is output as a new candidate character.

Further, when a character is evaluated or when a suspension of scan is carried out due to the degraded value of the evaluated result, of the latest contents saved in the save area $B_i$, the corresponding information in the work area $A_3$ is returned to the work area $A_3$ of the unit 100 and the re-start branch position information is returned to the dictionary scan point pointer $A_1$ of the unit 100. By this processing, the condition of the work area $A_3$ of the unit 100 is returned to the condition presented just before the branching starts, and the scan point is brought about at the beginning of the succeeding branch.

When the save area $B_i$ is returned to the unit 100, the save area pointed out by the save area pointer $A_2$ is simultaneously shifted by one node to the root.

When the scan point reaches the next branching node, one of the following three processes is selected on the basis of the code of the dictionary 3 indicated by the dictionary scan point pointer $A_1$: i. The code indicates position information of the succeeding branch (such as $TA_2$, $TA_3$):

Under this condition the same processing as the branching scan is executed. Namely the condition of the work area provided just before the branching and the next branching re-start position information are saved and then the sequential scan is executed.

ii. Data indicates the end of the tree branch group (TA=ET):

Under these circumstances the processing is executed from the start of the re-start scan. According to this processing, the node is returned by one step.

iii. The data indicates the end of the whole tree of the dictionary 3 (in the case of FIG. 5, the branch [13] is ended):

The evaluation dictionary scan is finished.

Figure 7B:
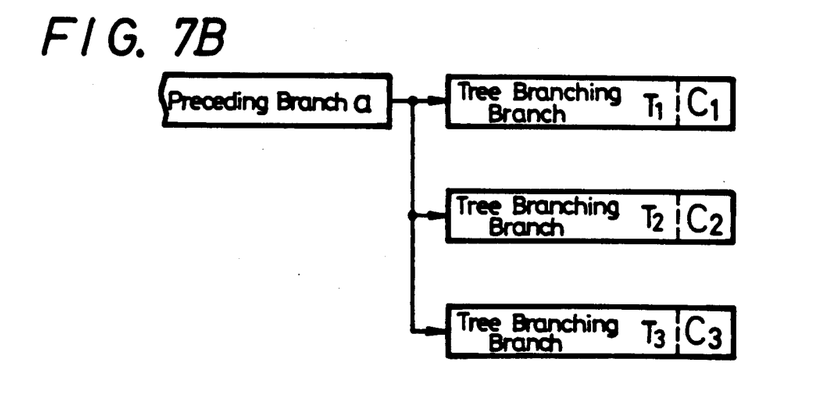

Of the evaluated characters outputted, only the character having, for example, the best evaluated result is used. That is, FIG. 7A becomes substantially as shown in FIG. 7B, wherein respective tree branches $T_1$, $T_2$, $T_3$ are scanned after the preceding branch a.

Parallel branching

Figure 8A:
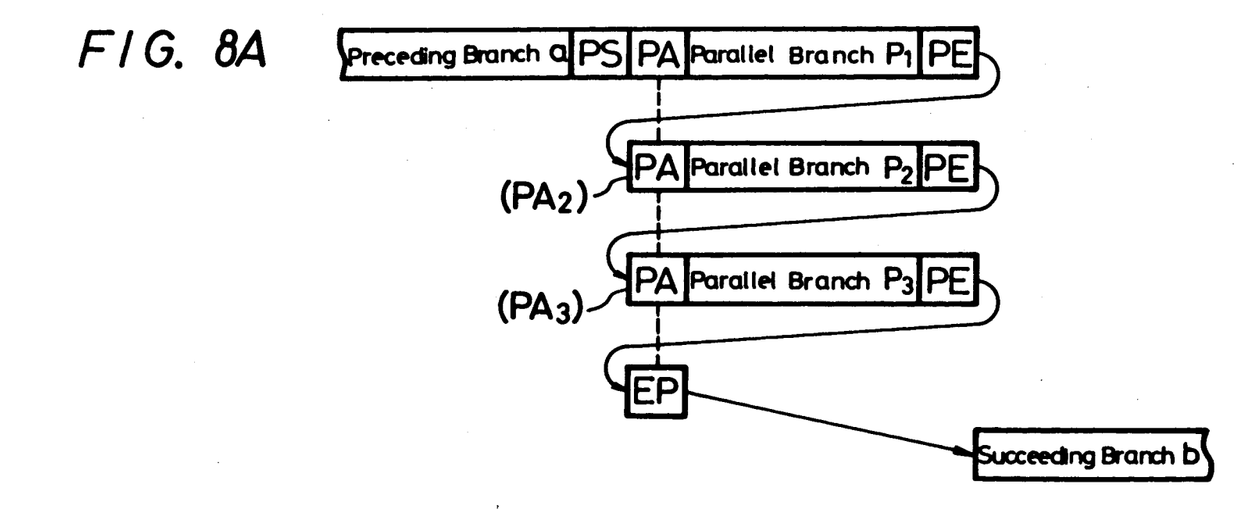
FIGS. 8A and 8B are, respectively, schematic representations used to explain locally parallel branching of the present invention.
Figure 8B:
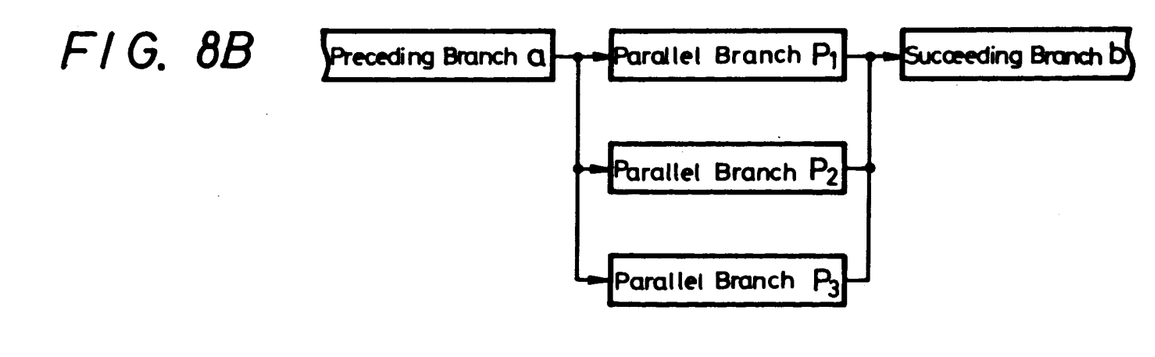
Figure 10:
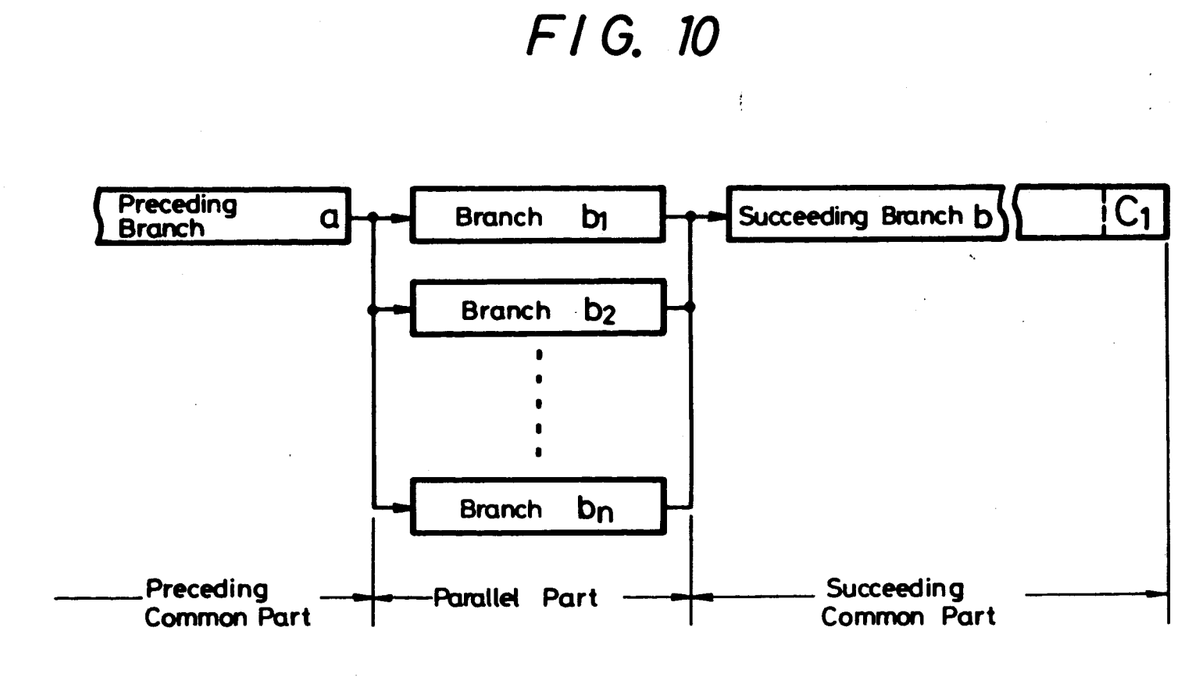
FIG. 10 is a schematic diagram to which reference is made in explaining parallel branching of the present invention.

When a characteristic of one portion of one character is described in any one of the branches $b_1, b_2, \ldots, b_n$ as shown in FIG. 10, the characteristic description becomes a preceding common part, a parallel part and a succeeding common part. Parallel branching is roughly classified to provide the following two cases depending on whether the stroke portions of the character described by the branches $b_1, b_2, \ldots, b_n$ correspond to the evaluation of the same portion or not:

i. Locally parallel branching (FIGS. 8A-8B)

Figure 9A:
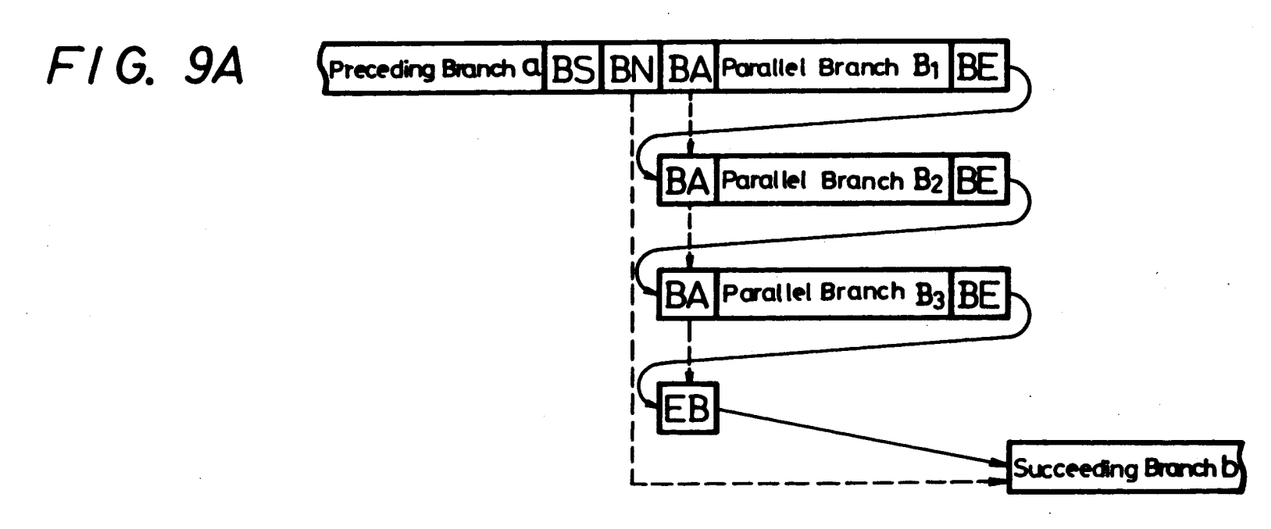
FIGS. 9A and 9B are, respectively, schematic diagrams used to explain parallel tree branching of the present invention.
Figure 9B:
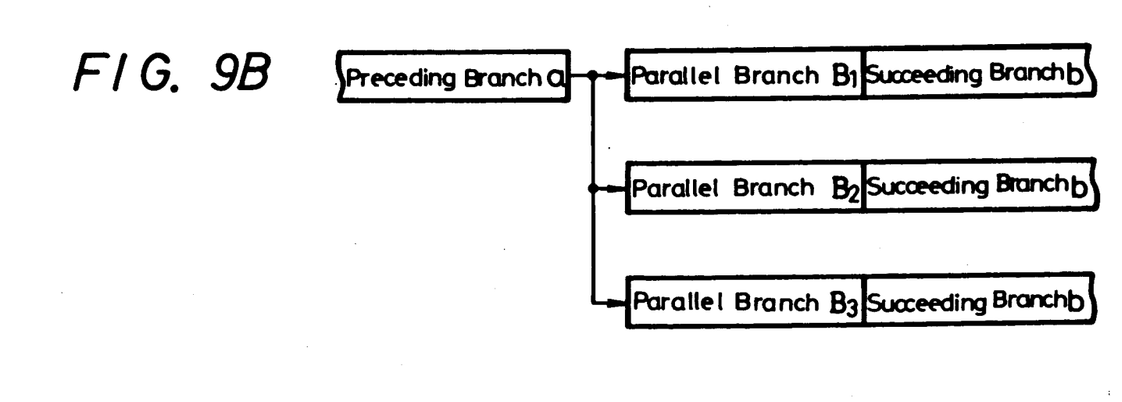

When the branches $b_1, \ldots, b_n$ relate to the same portion of the hand-written stroke, accordingly, when the extracted data scan points are invariable such as $B_1, \ldots, b_n$ in the start of the succeeding branch, this is referred to as "locally parallel branching." The locally parallel branching may be included in a desired branch. Thus, locally parallel branching may be included in one parallel branch $b_1$ which is one of the locally parallel branches, and may be subjected to recursive citation.

ii. Parallel tree branching (FIGS. 9A-9B):

For the case when the branches $b_1, \ldots, b_n$ describe different amounts of extracted data, such as when the branch $b_1$ describes the portion of two sub-strokes of the square style forming the real prototype of the Japanese character (this square style is known in Japanese as Kaisho) and $b_2$ describes the above two-strokes in the cursive or semi-cursive style, the extracted data scan point upon the start of the succeeding part is changed. This branching is referred to as "parallel tree branching," wherein the starting point of the parallel branching has to be processed as the tacit branching starting point.

The branch, which can include parallel tree branch, is restricted by a certain condition. This restriction is to be understood such that the "parallel branch of the locally parallel branch must not include a parallel tree branch from a semantics standpoint." This restricts the dictionary description by a certain degree. As will be described later, if the dictionary 3 does not satisfy the above restrictions, it is necessary to have a function to detect that the dictionary 3 satisfies the afore-noted restrictions. Upon the detection thereof, the dictionary 3 is incorrect, and the scan is ended.

The locally parallel branching and parallel tree branching will now be described in detail.

Locally parallel branching

As, for example, shown by the logic structure of the dictionary 3 in FIG. 8A, following the preceding branch a, a locally parallel branching start mark PS is located at a point (the starting portion of the locally parallel branching) in which the locally parallel branching becomes necessary. Then, similarly to the data TA, $T_j$ and TE in the case of tree branching, position data PA, parallel branch $P_j$ and end code PE are grouped as a set and, in this case, there are provided a plurality of the above sets (three sets in FIG. 8A).

The end code PE succeeding to the last parallel branch $P_3$ is followed by the end code EP which indicates the end of the parallel branching group, and the position data $PA_3$ of the parallel branch $P_3$ is employed as data indicative of the position of the end code EP. Further, the end code EP is followed by the succeeding branch b.

Since the length of the parallel branch $P_j$ is known from the position data PA, it may be possible that without providing the end code PE, the scan position pointer $A_1$ checks that the scan reaches the starting portion of the succeeding parallel branch.

When the locally parallel branching code PS is discovered in the sequential scan, the stack condition proceeds to the next stack condition (incremented by one step). Then, the stack condition $A_{411}$ of the locally parallel stack $A_4$ is shifted to the next one (incremented by one step), and data indicating the result of failure is temporarily saved in the result store memory $A_{412}$ indicated by the stack condition $A_{411}$. Thereafter, processing similar to the scan in the tree branching (save and re-start point set) is executed and then the sequential scan is continued.

When in the sequential scan of the parallel branch the locally parallel branching terminating condition is established or the scan suspension condition is established due to the degraded value of the evaluated result, the temporarily-evaluated result saved in the result store memory $A_{412}$ and the better evaluated result of the present result store memory $A_{32}$ of the unit 100 are again saved in the result store memory $A_{412}$. Then, the save area $B_1$ is copied to the unit 100 and recovered and the processing proceeds to the next parallel branch.

In this case, the processing is branched into the following two processes depending upon the code pointed out by the dictionary scan point pointer $A_1$ which was determined by the preceding process:

i. In the case of the succeeding parallel branch (in the case of $PA_2$ and $PA_3$):

The sequential scan is continued immediately after the position data PA.

ii. In the case of the completion of the parallel branch (in the case of PA=EP):

The content stored in the result store memory $A_{412}$ is shifted to the extracted data scan point pointer $A_{31}$. Then, the condition of the stack condition pointer $A_{411}$ is returned by one step and the following completion processing of the local parallel branch which will be described next is carried out.

This completion processing is branched to provide the following two processes depending on the result stored in the result store memory $A_{32}$.

i. Suspension of scan.

A suspension of scan is executed when all of the parallel branches have failed and the evaluated result in the result store memory $A_{32}$ indicates the failure, and the processing when the scan suspension condition is established is executed.

ii. Continuation of scan.

This processing is executed when there exists some of the parallel branches which reach the successful level and the evaluated result in the result store memory $A_{32}$ indicates the successful result, and the sequential scan is continued just after the position data PA (=EP).

Accordingly, the evaluation scan in this case substantially becomes as shown in FIG. 8B, wherein after the preceding branch a. the parallel branches $P_1$, $P_2$, $P_3$ are scanned and the succeeding branch b is then scanned. With respect to the evaluated result, one of the best evaluated results of the branches $P_1$, $P_2$ and $P_3$ is saved.

Parallel tree branching

FIG. 9A shows the structure of the dictionary 3. As shown in FIG. 9A, next to the preceding branch a, a parallel tree branching mark BS indicating parallel tree branch and the position data BN indicating the starting position of the succeeding branch b are located at the points in which parallel tree branching occurs. Then, similarly to the locally parallel branching, the position data BA, the parallel branch $B_j$ and the end code BE are provided as one set, and in this case, there are provided a plurality of (three sets in FIG. 9A) these sets. Then, the end code EB of parallel tree branch group is located at the end and this end code EB is followed by the succeeding branch b.

When parallel tree branching mark BS is discovered in the sequential scan, the position data BN of the succeeding branch b is saved in the scan continuation stack $A_{33}$ of the unit 100, and thereafter, processing similar to that of the aforementioned tree branching scan is executed.

Accordingly, in this case, the position data of the succeeding branch b is doubly saved both in the scan continuation stack $A_{33}$ of the unit 100 and the continuation stack saved in the save area $B_i$.

In order to understand that the scan point reaches the end of the save area $B_i$ of parallel tree branching in the sequential scan, it is proposed to prepare the end code BE in the dictionary description or to check whether the scan point pointer $A_1$ reaches the position of the position information of the re-start tree branching saved in the save area $B_i$ or not.

When the end condition of parallel tree branching $B_j$ is established in the sequential scan of parallel tree branching $B_j$, the same processing as the citation return scan is executed. In this case, however, since only the scan continuation stack $A_{33}$ of the unit 100 is derived and the continuation point stack saved in the save area $B_i$ is not changed, the position information of the succeeding branch b remains.

Therefore, the evaluation scan in this case substantially becomes as shown in FIG. 9B.

Figures 11A, 11B:
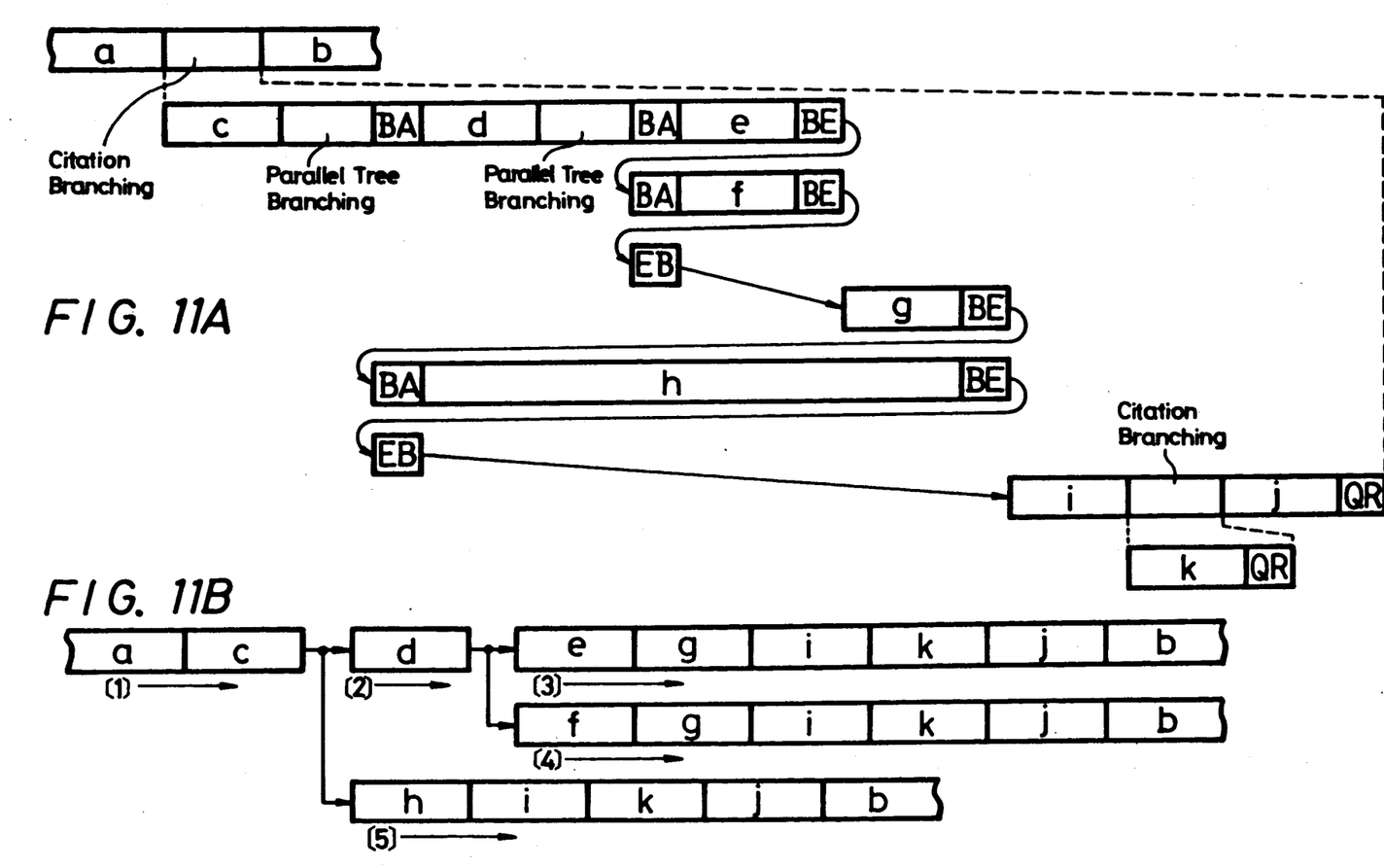
FIGS. 11A and 11B are schematic representations to which reference is made in explaining the logic structure of the present invention, respectively.

FIG. 11A shows an example of a logic structure of the dictionary 3 to which the present invention is applied, and FIG. 11B shows the substantial scan order thereof. In FIGS. 11A and 11B, reference letters a to k designate branches.

According to the present invention, as shown in FIGS. 11A and 11B, citation branching can be branched and also, the branching can be further branched. In order to realize the above-mentioned structure, the scan condition save unit is provided, wherein as shown, for example, in the scan [4] of FIG. 11B, even at the completion of citation branching, the scan is re-started in citation branching.

As will be apparent from FIGS. 11A and 11B, the logic structure of the dictionary 3 can be made complex, whereby the dictionary 3 can be made compact in size and the recognition can be carried out at high speed.

As described above, according to the present invention, the size of the recognition dictionary 3 can be considerably compressed. That is, the recursive use of the citation description is made possible with the result that the dictionary 3 can be compressed. In the citation description, parallel tree branching can be used, thus allowing compression of the dictionary 3. Further, since parallel tree branching can be used again in other parallel tree branching, the dictionary 3 can be further compressed.

Furthermore, since common portions such as a radical (Hen) and the like in which the hand-writing is started is evaluated once, the time for recognition can be reduced. In other words, since locally parallel branching is used and the succeeding branch is evaluated once, the dictionary can be compressed in size and also the time for recognition can be reduced.

Having described a preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

We claim as our invention:

1. A hand-written, on-line character recognition apparatus comprising:
    (a) means for electronically receiving hand-written stroke pattern information data;
    (b) dictionary means organized in a tree and branch structure for electronically storing character data describing stroke characteristics of characters, the beginning and ending of each branch being taken as different nodes with one or more branches sharing the same nodes;
    (c) evaluation scan control means for scanning the tree and branches of the dictionary means to search for character data corresponding to the hand-written stroke pattern information data, wherein the evaluation scan control means compares the hand-written stroke pattern information data with the character data stored in the successive branches of the dictionary means, continuing on to the next successive branch as long as the degree of inconsistency does not exceed a predetermined limit and returning to the previous node to perform the same operation with respect to the character data stored in an alternative branch when the degree of inconsistency does exceed the predetermined limit; and
    (d) save means for storing the conditions of the evaluation scan control means, wherein at least the conditions of the evaluation scanning existing at the beginning of each branch are saved in the save means upon branching in order to allow recursive use of the branches of the character data stored in the dictionary means when the evaluation scan control means has returned to the alternative branch after the degree of inconsistency exceeded the predetermined limit.

2. A hand-written, on-line character recognition apparatus comprising:
    (a) means for electronically receiving hand-written pattern information data;
    (b) dictionary means organized in a tree and branch structure for electronically storing character data describing characteristics of characters, wherein the tree structure of the dictionary means includes at least citation branching, parallel branching and tree branching, the parallel branching being classified into parallel tree branching and locally parallel branching;
    (c) evaluation scan control means for scanning the tree and branches of the dictionary means to search for character data corresponding to the hand-written pattern information data; and
    (d) save means for storing the conditions of the evaluation scan control means, wherein at least the conditions of the scanning existing at the beginning of each branch are saved in the save means upon branching in order to allow recursive use of branches of the character data stored in the dictionary means.

3. A hand-written, on-line character recognition apparatus as cited in claim 1, wherein the evaluation scan control means proceeds to scan a successive branch after saving the best evaluation result when scanning each branch during locally parallel branching.

4. A hand-written, on-line character recognition method comprising the steps of:
    (a) electronically receiving hand-written stroke pattern information data;
    (b) electronically storing character data describing stroke characteristics of characters in a tree and branch organizational structure, the beginning and ending of each branch being taken as different nodes with one or more branches sharing the same nodes;
    (c) electronically evaluation scanning the tree and branches of the electronically stored character data to search for character data corresponding to the hand-written pattern information data, wherein the evaluation scanning includes comparing the hand-written stroke pattern information data with the successive branches of the stored character data nd continuing on to the next successive branch as long as the degree of inconsistency does not exceed a predetermined limit and returning to the previous node to perform the same operation with respect to the character data stored in an alternative branch when the degree of inconsistency does exceed the predetermined limit; and
    (d) storing the conditions of the evaluation scanning, wherein at least the conditions of the evaluation scanning existing at the beginning of each branch are stored upon branching in order to allow recursive use of the branches of the stored character data when the evaluation scanning process returns to the alternative branch after the degree of inconsistency exceeded the predetermined limit.

5. A hand-written, on-line character recognition method comprising the steps of:
    (a) electronically receiving hand-written pattern information data;

(b) electronically storing character data describing characteristics of characters in a tree and branch organizational structure, including the steps of storing the data by at least citation branching, parallel branching the tree branching, the parallel branching being classified into parallel tree branching and locally parallel branching;

(c) electronically evaluation scanning the tree and branches of the electronically stored character data to search for character data corresponding to the hand-written pattern information data; and (d) storing the conditions of the evaluation scanning, wherein at least the conditions of the evaluation scanning existing at the beginning of each branch are stored upon branching in order to allow recursive use of branches of the stored character data.

6. A hand-written, on-line character recognition method as cited in claim 4, wherein the evaluation scanning step further includes the steps of proceeding to scan a successive branch after saving the best evaluation result when scanning each branch during locally parallel branching.

7. A hand-written, on-line character recognition apparatus as cited in claim 2, wherein the evaluation scan control means proceeds to scan a successive branch after saving the best evaluation result when scanning each branch during locally parallel branching.

8. A hand-written, on-line character recognition method as cited in claim 5, wherein the evaluation scanning step further includes the steps of proceeding to scan a successive branch after saving the best evaluation result when scanning each branch during locally parallel branching.

* * * * *